Patented Aug. 11, 1942

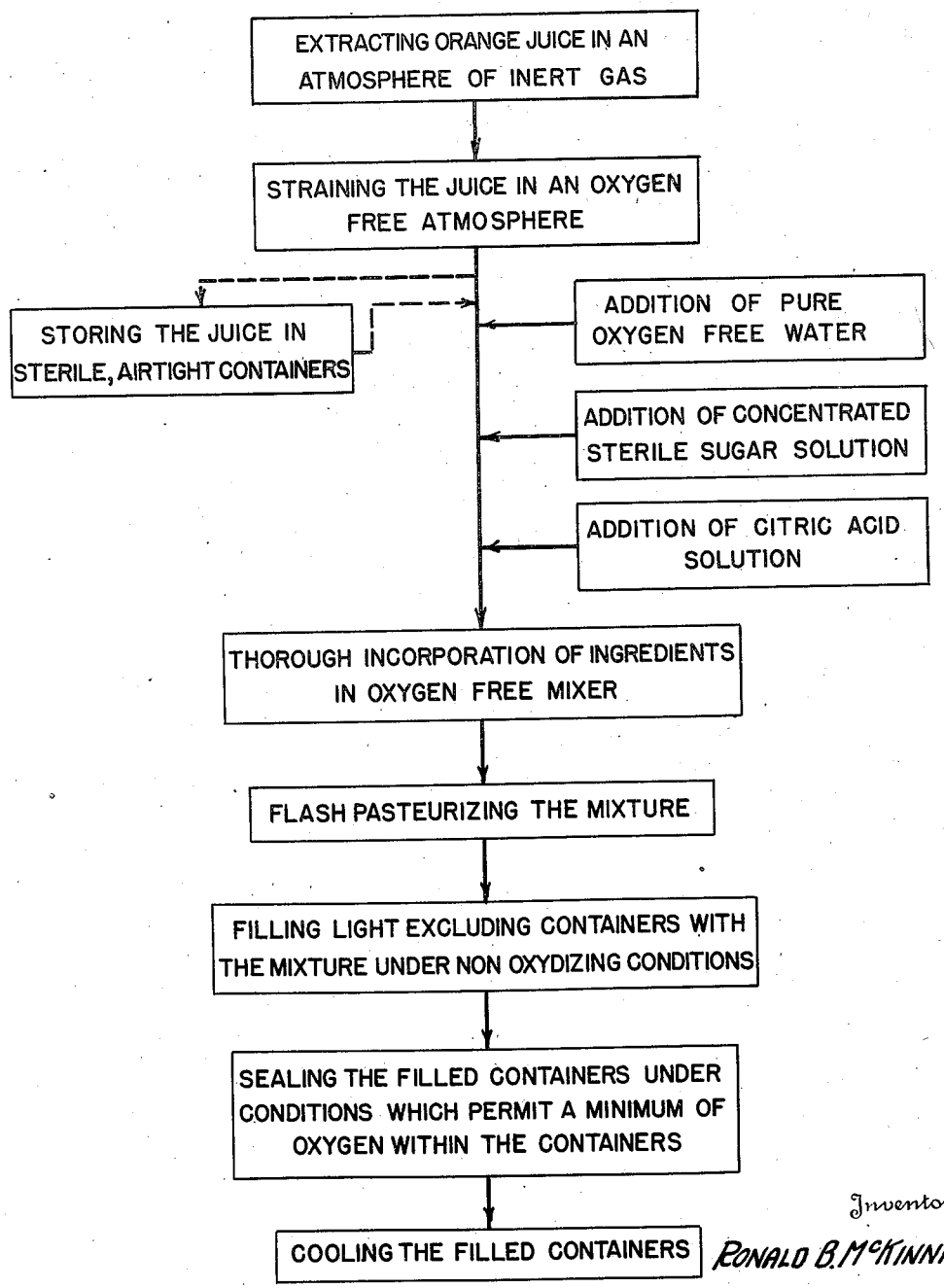

2,292,460

UNITED STATES PATENT OFFICE 2,292,460

PROCESS OF PREPARING ORANGE BEVERAGE

Ronald B. McKinnis, Winter Haven, Fla., assignor to Sunshine Foods, Inc., Winter Haven, Fla., a corporation of Florida Application March 15, 1940, Serial No. 324,194

5 Claims. (Cl. 99—155)

This invention relates to processes for producing a novel orange drink with high retention of flavor and vitamin content.

Some objects are the production of a high quality orangeade without the addition of orange flavoring materials other than the orange juice, and with long keeping qualities.

Orange drinks produced heretofore have frequently been of doubtful quality. A high percentage of them according to several recent reports retain but little vitamin C. Most orange drinks contain but a small amount of orange juice anyway. If lemon juice is added to increase the acidity, some increase in vitamin C will result, but the bottling and handling methods do not retain it, and the product must in general be prepared and sold fresh.

While a concentrate base may retain the vitamin C to a high degree it is nevertheless poor in the aromatic zestful quality of an orange. This is alleviated to some extent by the addition of peel oil or other flavoring materials. Some orange drink manufacturers prepare their own orange juice in an endeavor to increase the quality of the product, but since oranges of uniform quality at a reasonable price are not available throughout the year, some method of storage is essential.

The list of ingredients foreign to oranges which goes into the usual commercial orange drink is most astounding—dye coloring material, peel oil, ground carrots, etc. This is all the more astonishing when one considers that orange is the most popular flavor for soft drinks, and that it should be a healthful beverage. There are good orange drinks, but it can be truthfully said that they are rare.

Since orange drinks are so popular, and since they are the preferred beverage for children, the reasons for the wide variation of quality and lack of uniformity of the various orange drinks are of interest. I have found that the production of high quality orangeade is beset with many difficult problems. These problems are as follows:

1. Source of orange base. As previously described, it is impossible to produce a concentrate without loss of flavor. Fresh oranges are unreliable.

2. The low quality of the orange base makes fortification of flavor and color necessary.

3. The presence of orange juice makes necessary the use of preservative or pasteurization.

4. The orange drinks do not long retain their original quality so must be quickly distributed to the consumer.

5. Quality of the orange drink, even when fresh, needs considerable improvement.

6. The distribution has been faulty, since it has been mainly local due to the short storage life of the ordinary orange drink.

Among the objects of this invention are the solution of these problems.

Other objects will be apparent from the ensuing description.

The ideal orange drink must be prepared from unimpaired orange juice of high quality. Air must be excluded during all steps of the process. The drink must be packaged in a light excluding, air-tight container of material that will not affect the flavor. Colored glass or enamel lined cans can be used. Only pure materials must be used. The final product must be palatable, truly orange in flavor, nutritively desirable and capable of storage at ordinary temperatures for periods of at least one year.

Some of my co-pending applications describe methods and apparatus useful in the attainment of the aims. By my process, the orange juice used is produced by my system of extracting the juice from the fruit within an inert gas filled extractor, so that the juice is originally produced free from incorporated air. I have found that this system is ideally adapted to the present process. Whether the juice as produced is used immediately with appropriate straining, also in an oxygen-free atmosphere, or used after suitable storage, as in cans preserved by my process, is immaterial to the accomplishment of my aims.

The final product, orange beverage, contains according to my preference, approximately 50% by volume of pure orange juice of low peel oil content, low rag or other extraneous matter other than juice sacs and having good color and flavor, with approximately 50% pure water added and sufficient sugar to bring the mixture to a Brix of 11 to 16°, and citric acid to bring the content to 1% to 1.4% of anhydrous citric acid. A very good drink can be prepared by bringing the mixture to 13° Brix sugar content and 1.2% of anhydrous citric acid.

I have shown in the single sheet of drawings a flow diagram indicating the steps in the process.

First, the orange juice is extracted in an atmosphere of sterile inert gas. In one type of machine which I may employ the oranges are fed into the extracting chamber through a fluid seal. In the extracting chamber there is maintained an atmosphere of carbon dioxide, or a mixture of carbon dioxide and nitrogen. The hulls are discharged from the extracting chamber through a fluid seal. Thus, access of oxygen to the juice is substantially prevented.

The juice may then be strained in an oxygen free atmosphere and may be stored in air-tight sterile containers. The storage step is optional, and from the straining step the pure unoxidized juice may be passed directly to the mixing step in which pure boiled water is added to the juice. A very excellent juice can be prepared by mixing a drink in which approximately 50% of the drink is orange juice and 50% is pure boiled water. A boiled sugar solution in concentrated form is added to bring the total mixture to a sugar content of 11° to 16° Brix. Boiling the sugar solution prevents spoilage due to contamination of the sugar. An excellent mixture is one in which the sugar content is 13° Brix. In this stage is also added citric acid so as to bring the content of the mixture to approximately 1% to 1.4% anhydrous citric acid.

These various ingredients are thoroughly mixed in an oxygen free atmosphere, and the mixture may then be flash pasteurized. Optionally the flash pasteurization step may be omitted and the mixture pasteurized after it has been sealed in the containers.

From the flash pasteurization step the mixture is fed to light excluding containers where non-oxidizing conditions are maintained. For instance, I may feed the mixture to enamel cans which have been heated to a sterilizing temperature by steam jets. The sterile juice may be fed to the bottom of the cans and a blanket of steam maintained on the surface of the juice as it rises in the cans. The rate of feed of the juice to the cans should be such that the turbulence of the juice does not rupture the steam blanket on the surface of the juice and permit access of oxygen from the air to the juice.

It is to be noted that in all stages of the process great care must be exercised in excluding oxygen. It has been found that any substantial amount of oxygen starts deterioration in the qualities of the flavor and vitamin content which are progressive. In other words, slight oxidation shows an increasing effect during storage. The care with which oxidation is prevented should be such as to permit the beverage to be stored for periods as great as a year without substantial deterioration in either the vitamin or flavor characteristics of the mixture.

The containers which have been filled under non-oxidizing conditions are then sealed in such a manner as to minimize oxidation and are cooled and may be stored.

I desire that my invention be limited only by the appended claims and the showing of the prior art.

I claim:

1. A method of preparing an orange beverage comprising extracting the juice from whole fruit in a zone of inert gas, adding water, sugar and citric acid to the juice until the acid content lies between 1% and 1.4% anhydrous citric acid and sealing the beverage in containers.

2. A method of preparing an orange beverage comprising extracting the juice from whole fruit in a zone of inert gas, adding water and sugar to the juice until the sugar content lies between 11° and 16° Brix, adding citric acid to bring the acid content to between 1% and 1.4% anhydrous citric acid and sealing the orange beverage in containers.

3. A method of preparing an orange beverage comprising the steps of extracting the juice from whole fruit in an atmosphere of inert gas, adding water and sugar to the juice until the sugar content is 13° Brix, adding citric acid until the acid content is 1.2% anhydrous citric acid, and sealing the orange beverage in containers.

4. A method of preparing an orange beverage comprising the steps of extracting the juice from whole fruit in an atmosphere of inert gas, straining the extracted juice in an atmosphere of inert gas, adding water and sugar to the strained juice until the sugar content lies between 11° and 16° Brix, adding citric acid until the acid content lies between 1% and 1.4% anhydrous citric acid, thoroughly mixing the ingredients in the absence of air and sealing the orange beverage in containers under non-oxidizing conditions.

5. A method of preparing an orange beverage comprising extracting the juice from whole fruit in an atmosphere of inert gas, straining the extracted juice in an atmosphere of inert gas, adding water and sugar until the sugar content is 13° Brix, adding citric acid to bring the acid content to 1.2% anhydrous citric acid, thoroughly mixing the ingredients in the absence of air, and sealing the orange beverage into containers under non-oxidizing conditions.

RONALD B. McKINNIS.